United States Patent Office 3,531,420
Patented Sept. 29, 1970

3,531,420
TETRAHALIDES OF TRANSITION METALS REDUCED WITH ACTIVATED ALUMINUM POWDER
Erik Tornqvist, Roselle, N.J., assignor to Esso Research and Engineering Company, a corporation of Delaware
No Drawing. Continuation-in-part of applications Ser. No. 351,848, Mar. 13, 1964; Ser. No. 431,641, Feb. 10, 1965; and Ser. No. 574,933, Aug. 25, 1966. This application Oct. 19, 1966, Ser. No. 587,698
The portion of the term of the patent subsequent to Jan. 7, 1986, has been disclaimed
Int. Cl. B01j *11/78, 11/84*
U.S. Cl. 252—442      11 Claims

ABSTRACT OF THE DISCLOSURE

A superior method for preparing reduced titanium or vanadium halides used as a catalyst component, by use of an aluminum powder reducing agent which has been activated. The activation is accomplished by grinding the aluminum powder with an inert metal halide prior to reacting with the titanium or vanadium composition being reduced. Superior catalyst components are obtained which are secured in better yields with shorter reaction times.

---

This application is a continuation-in-part of Ser. No. 351,848, now Pat. No. 3,301,494, filed Mar. 13, 1964, Erik Tornqvist inventor, Ser. No. 431,641, now Pat. No. 3,424,774, filed Feb. 10, 1965, Erik Tornqvist inventor, and Ser. No. 574,933 (abandoned), a continuation-in-part of Ser. No. 431,641, filed Aug. 25, 1966.

The invention relates to the preparation of catalysts useful for promoting the low pressure polymerization of alpha olefins. In particular, this invention relates to the reduction of transition metal tetrahalides with activated aluminum powder to crystalline transition metal halides optionally cocrystallized with aluminum halide. Additionally, the invention is directed to a method for the partial reduction of titanium tetrachloride to substantially pure highly crystalline gamma titanium chloride cocrystallized with $AlCl_3$, particularly gamma-$TiCl_3 \cdot yAlCl_3$.

The low pressure polymerization and copolymerization of alpha olefins with catalyst systems containing crystalline partially reduced heavy transition metal halides cocrystallized with aluminum halides to high density, high molecular weight solid products is now well known. Numerous techniques have been reported for the preparation of the cocrystalline partially reduced heavy transition metal halide-aluminum halide catalyst components. However, all previously reported methods for the formation of these catalyst components have suffered from one or more defects. Methods have for instance been developed in which titanium or vanadium tetrahalides are reduced directly with aluminum in the absence of a diluent. Such methods, whether carried out with an excess of transition metal tetrahalide or not, have usually required rather high reaction temperatures, in the order of 200° C. or higher. Furthermore, in those cases which have not involved an excess of transition metal tetrahalide, the reaction product has been obtained as a solid, often in caked form, which has been difficult to handle and recover.

While on the other hand, it has been possible to recover the reaction product in slurry form in those cases where an excess of liquid transition metal halide has been employed, the use of tetrahalide in excess has required very extensive washing and drying of the reaction product for complete removal of the tetrahalide, and it has prevented the formation of highly active cocrystalline catalyst components in which the transition metal is in an average valence state of between 2 and 3.

A very great improvement resulted from the discovery that the partial reduction of titanium tetrachloride with aluminum powder could be carried out at significantly lower temperatures, in some cases even as low as about 80° C., if it were carried out in a substantially aromatic diluent as described in U.S. Pat. 3,032,513. It was demonstrated that cocrystalline titanium chloride-aluminum chloride catalyst components of very attractive properties could be prepared in this manner, particularly in benzene diluent at elevated pressures which would allow the reaction to be carried out at temperatures as high as 150°–200° C. In addition to making it possible to carry out the reduction at lower temperatures than had been previously thought possible, the use of a substantially aromatic diluent made it possible to carry out the reaction in an easily handled slurry without the use of excess $TiCl_4$. Furthermore, by proper selection of diluent type and reaction pressure it was possible both to control the reaction temperature and to remove the rather high heat of reaction by refluxing of the diluent. However, while amounting to a highly significant improvement over the prior art, this slurry reduction method in a substantially aromatic diluent has still been associated with some drawbacks.

Even though the reduction will readily proceed at moderate temperatures such as 125–150° C., the rate of reaction with commercially available aluminum powder is usually so low that complete reaction of the metal is secured only after several hours of refluxing. This exposes the aromatic diluent to highly acidic transition metal tetrahalide for a considerable time period and may cause diluent decomposition and tar formation, especially when less stable aromatic compounds such as xylene and tetralin are used.

In some cases it has also been found necessary to use an excess of $TiCl_4$ in order to secure a complete reaction of the aluminum powder within a reasonable period of time and at a moderate temperature. Besides aggravating the tendency toward formation of undesirable tarry or oily contaminants, the addition of excess $TiCl_4$ often causes purification problems, since $TiCl_4$, if left in the solid catalyst component, will cause low activity and poor polymer properties.

The slow reduction with commercial aluminum powder also results in the formation of structurally inhomogeneous cocrystalline titanium chloride-aluminum chloride preparations unless very long reaction times are used, which is unsuitable because of the tendency for decomposition of the diluent.

Another known method of preparing a cocrystalline purple titanium chloride-aluminum chloride catalyst component under relatively mild temperature conditions involves the reduction of TiCl$_4$ with a stoichiometric amount of a reactive aluminum alkyl as described in U.S. 3,032,511. This method leads to the formation of a cocrystalline material of a novel crystal structure which is now usually known as gamma-titanium trichloride, even though this structure may only occur when some cocrystallized aluminum chloride is present. The cocrystallized gamma-titanium chloride-aluminum chloride thus obtained exhibits rather attractive properties as a catalyst component for making poly-alpha-olefins; however, its stereospecificity in polymerization reactions has generally not been equivalent to that of the better titanium chloride-aluminum chloride preparations made by aluminum reduction of TiCl$_4$. This deficiency is believed to be the consequence primarily of the presence of organic contaminants resulting from the polymerization of disproportionated alkyl radicals formed in the metal alkyl reduction of the TiCl$_4$. For instance, it has been found that gamma-TiCl$_3$·0.33AlCl$_3$ prepared by reduction of TiCl$_4$ with triethylaluminum is almost always contaminated with some polyethylene. Thus it appears that highly crystalline cocrystallized titanium chloride-aluminum chloride catalyst components which are entirely free of organic contaminants can be prepared only by reduction of TiCl$_4$ with metallic aluminum.

Since the reaction of stoichiometric amounts of TiCl$_4$ and aluminum is associated with certain heat transfer and product handling problems and since the use of excess TiCl$_4$ imposes limitations on the final cocrystalline material and causes considerable washing and drying problems, the slurry reduction process in a substantially aromatic diluent has remained the most practical one for making cocrystalline titanium chloride-aluminum chloride catalyst components. However, the usefulness of this method has been somewhat limited by the above-mentioned difficulties relating to diluent decomposition and formation of structurally non-homogeneous products as a result of the low reactivity of normal commercially available aluminum powder. Considerable effort has been expended attempting to determine methods for increasing reactivity of the aluminum powder.

Some improvement was demonstrated when alkyl-halides, mercuric chloride or mercury were used as activators. A considerable increase in the rate of reduction was realized with an experimental grade of aluminum powder obtained from Aluminum Company of America. This experimental grade consisted of Alcoa air atomized grade #101 (average particle diameter 17–19 microns) which had been ball milled in kerosene under inert conditions for the purpose of removing the thin oxide coating which always exists on air atomized aluminum powders. In spite of its high reactivity, this aluminum powder exhibited several disadvantages.

In accordance with the present invention, it has now been discovered, surprisingly, that superior catalyst components of the composition MX$_x$·yAlX$_3$ wherein M is titanium or vanadium or a mixture of these metals, X is chlorine or bromine, $x$ is a number between 2 and 3, inclusive, and $y$ is a number usually between 0.33 and 0.67, inclusive, can be prepared in a diluent system containing at least a minor amount of aromatic constituents by the quantitative reduction of MX$_4$ with aluminum powder highly activated according to a novel method. The quantitative reduction, made possible by the highly activated aluminum removes all MX$_4$ from the system and thus eliminates the need for washing the solid catalyst component. The catalyst components thus obtained exhibit not only superior properties, but are also secured in better yields, at shorter reaction times and in a simpler manner than with previously available techniques.

In carrying out the present invention, a titanium or vanadium tetrachloride or bromide of high purity, preferably containing only very minor amounts of impurities, is reacted with highly activated aluminum powder in a diluent system containing at least minor amounts of aromatic constituents to form a component products having the general formula:

$$MX_x \cdot yAlX_3$$

wherein M is either titanium or vanadium, X is either chlorine or bromine, $x$ varies from 2 to 3, preferably from 2.5 to 3.0, and $y$ ranges from 0.33 to 0.67, and usually is $(4-x)/3$.

The highly activated aluminum powder used in the process is a finely divided ball milled or atomized aluminum powder such as Alcoa Grade 123 that has been subjected to an attrition operation in the presence of a suitable metal halide salt. The technique for the formation of the activated aluminum powder is described in copending application Ser. No. 351,848, filed Mar. 13, 1964, now U.S. Pat. 3,301,494 issued Jan. 31, 1967 the disclosure of which is herein incorporated by reference.

In general, the attrition process is conducted by placing the aluminum powder to be activated and a non-akali metal halide grinding aid in a ball mill, a pebble mill or other suitable grinding device and then milling the metal halide and the aluminum powder in the absence of diluents in an inert atmosphere, such as a nitrogen or argon atmosphere that is substantially free of oxygen or water vapor, for a period of time sufficient to substantially attrite the aluminum powder and impart to it the high reactivity which is of critical importance for the facile and complete reduction of titanium and vanadium tetrahalides according to the process of this invention. Effective grinding can normally be obtained when the molar ratio of aluminum powder to metal halide grinding aid present in the grinding zone falls within the range of from about 1:1 to 20:1. However, the most efficient activation is usually obtained when the molar ratio of aluminum powder to metal halide grinding aid present in the grinding zone is within the range of from about 3:1 to 12:1.

The optimum time period for the dry milling operation depends, in general, upon the efficiency of the equipment used, the grinding aid used, the ratio between the aluminum powder and the grinding aid, and the degree of attrition (activation) desired. Activated aluminum powders having an average particle diameter in the range of 5–100 microns are especially suited for the activation through grinding and the subsequent reduction process. When a ball mill employing steel balls of from 0.25 to 2.0 inches in diameter as the grinding medium is used, aluminum powders having the desired high reactivity are normally secured within from 0.2 hour to 30 days of ball milling time. However, times ranging from 0.2 to 10 days will be more common. The grinding operation should be conducted at temperatures below the temperature at which the aluminum powder and grinding aid fuse.

As a general rule, the grinding efficiency of ball mills operated under optimum conditions increases with jar size. Hence, in large scale industrial operations the required milling time may be considerably shorter than that found necessary in small scale laboratory experimentation. Additionally, a reduction of the grinding time may be realized by utilizing modified vibrating or swinging mills in which centrifugal or other forces are utilized for increasing the effective density of the grinding medium. The minimum time period needed for obtaining the activation necessary for preparing the cocrystalline titanium or vanadium halide-aluminum halide catalyst components according to this invention can be easily determined by routine experimentation.

Since the mechanism by which the grinding operation imparts the critically high reactivity to the aluminum powder is not well known or understood, there is no simple physical measurement that can be used for determining when the required activation has been accomplished. However, it has been found that the reactivity of the activated aluminum powder is sufficient when it will start reducing titanium tetrachloride in a 1 to 2 molar solution in benzene at room temperature (about 72° F.) with formation of brown titanium trichloride cocrystallized with aluminum chloride as described in Examples 4 and 5 of copending patent application S.N. 431,641 filed Feb. 10, 1965 now U.S. Pat. 3,424,774 issued Jan. 28, 1969. However, the test for reactivity need not be carried out on a relatively large scale in stirred glass flasks as described in the above-mentioned examples, but can be simply carried out by adding a small amount, in the order of 0.1–0.5 gram, of activated aluminum powder to 10–20 milliliters of 1–2 M benzene solution of titanium tetrachloride in a test tube inside a nitrogen or argon containing dry box. When the reactivity of the aluminum powder is sufficient one will immediately notice the formation of brown titanium trichloride accompanied by the simultaneous liberation of heat. Depending upon the relative charges, the activity of the aluminum powder, the extent of mixing the components by shaking the test tube, etc., the heat generation may actually reach a level which will cause the benzene diluent to boil. However, as a rule, the aluminum powder is sufficiently active when substantial reduction of the titanium tetrachloride takes place under the conditions described above, whether heating of the diluent to boiling takes place or not.

The grinding of aluminum powder together with a suitable metal halide under high intensity conditions, e.g. with steel balls or the like, will eventually lead to a significant darkening of the metal-halide mixture, and this darkening can be used for visually establishing the effect of the grinding. However, the activation accomplished when a significant darkening can be detected is usually considerably greater than what is needed for preparing the cocrystalline transition metal halide-aluminum halide compositions according to this invention. Thus the titanium chloride reduction test in benzene is the preferred one for establishing the activation of the aluminum powder even though it is more cumbersome than a simple visual observation. Of course, once the required grinding time needed with any particular type of equipment has been established through the titanium chloride reduction test in benzene and then confirmed by the successful preparation of a cocrystalline titanium chloride-aluminum chloride composition according to this invention, no further tests for activity are required as long as the grinding conditions are unchanged.

The metal salt grinding aids used in the formation of the activated aluminum powders, preferably have metal moieties that are at least as electropositive as aluminum. Representative, nonlimiting examples of suitable grinding aids include aluminum chloride, aluminum bromide, zinc chloride, magnesium chloride, etc. Additionally, the final catalyst product, such as vanadium trichloride cocrystallized with aluminum chloride or titanium chloride cocrystallized with aluminum chloride can also be used as the grinding aid.

After the grinding operation has been completed, the grinding aid can, if desired, be separated from the aluminum powder by employing any one of a wide variety of techniques. For example, the metal halide grinding aids can be removed from the mixture of grinding aid and aluminum powder by sublimation. In a similar manner, the metal halide grinding aid can be reacted with an alkyl metal compound to form a more volatile product which is then removed from the activated aluminum powder by evaporation, e.g. distillation or sublimation.

The preferred technique for the separation of grinding aids from the activated aluminum powder involves contacting the mixture with an alkyl metal compound that will react with or complex with the metal halide of the system to form a product soluble in suitable inert solvents. With this method, the total mixture is then contacted with a diluent that will solubilize the reaction product or complex, whereupon the mixture is filtered, decanted or centrifuged, possibly with additional diluent washing, and the highly reactive aluminum powder substantially free of grinding aid is secured. Particularly valuable alkyl metal compounds are the alkyl aluminum compounds having 2 to 8 carbon atoms per alkyl group. Representative examples of useful alkyl aluminum compounds are triethylaluminum, tripropyl-aluminum, triisobutylaluminum, etc.

The inert diluents suitable as wash liquids include $C_5$ to $C_{12}$ aliphatic or aromatic hydrocarbons such as n-hexane, n-heptane, cyclohexane, benzene, toluene, xylene, etc.

When $AlCl_3$ is the metal halide grinding aid and it is desired to make a cocrystallized transition metal chloride-aluminum chloride composition in which the aluminum chloride content is higher than the amount formed during the reduction, part or all of the $AlCl_3$ may be left with the aluminum powder used for reducing the $TiCl_4$ or $VCl_4$ under the critical conditions of this invention. Such a simplified procedure can be employed in spite of the tendency of $AlCl_3$ to attack the diluent because of the high reactivity of the aluminum which makes it possible to complete the reduction within a fairly short period of time and at a moderately elevated temperature. Furthermore, the substantial solubility of $AlCl_3$ in aromatic diluents at moderately elevated temperatures makes it possible for most or all of the $AlCl_3$ added with the activated aluminum powder to cocrystallize with the crystalline transition metal chloride formed during the reduction.

Another case where no removal of halide grinding aid is needed occurs when the halide used is a cocrystalline halide of substantially the same composition as the transition metal-aluminum halide to be prepared in the subsequent reduction of a titanium or vanadium tetrahalide. In this case, which is an especially preferred method of activating the aluminum, no need for halide removal exists, since the presence of the halide grinding aid will not significantly alter the composition of the final desired cocrystalline transition metal-aluminum halide product.

Because of the crystallographic changes which often take place in cocrystalline titanium or vanadium-aluminum halides during grinding, it could, of course, be expected that the transition metal-aluminum halide grinding aid would introduce crystallographic impurities into the final cocrystalline preparation. However, the crystallographic changes taking place during the grinding result primarily from a sliding of the halide-metal-halide double layers in the crystal structure relative to each other and thus amount to the appearance of a disordered stacking of the halide layers, which were previously positioned relative to each other so as to give cubic or hexagonal closest packing for the halogen atoms. The heat treatment of the crystallographically disordered transition metal-aluminum halide in connection with the subsequent reduction reaction apparently has an annealing effect, i.e. it causes a reversal of the halide layer stacking disorder, so that the original crystal structure is largely restored. Thus the final product will have essentially the same structure as would have resulted from the reduction of the particular transition metal tetrahalide with pure activated aluminum powder.

The use of the activated aluminum-metal halide grinding aid mixture instead of the purified activated aluminum powder for the reduction of the transition metal tetrahalide results in another process improvement, since activated aluminum powder containing a halide or mixed halide like $AlCl_3$ and $TiCl_x \cdot yAlCl_3$ is much less pyrophoric and therefore much safer and easier to handle than similarly activated aluminum powder. The reason for this is that the salt partly protects the metal from being oxidized when exposed to air and that, if the metal is heated by oxidation or any other exothermic reaction, the halide will be volatilized thus absorbing much heat and preventing a critical temperature buildup.

The hydrocarbon diluent system used in the reduction of the heavy transition metal tetrachloride or bromide with the activated aluminum powder is one of the critical features of the present invention. The diluent system used may be made up of completely aromatic constituents or a mixture of aromatic and aliphatic constituents. When substantially pure gamma $TiCl_3 \cdot yAlCl_3$ is prepared the diluent system is preferably a diluent mixture composed of a major amount of aliphatic materials and a minor amount of aromatic constituents. Diluent systems made up completely of aliphatic constituents should be avoided. In general, the aromatic constituents of the diluent system may be either unsubstituted or lower alkyl or halide substituted mono-nuclear aromatic compounds or mixtures thereof. Examples of suitable diluents are benzene, toluene, xylene, mesitylene, pseudocumene, ethylbenzene, cymene, Tetralin, diphenyl, chlorobenzene, o-dichlorobenzene, o-chlorotoluene and the like.

While the presence of aromatic constituents in the diluent is a critical requirement, the minimum amount of such constituents necessary for carrying out the reduction at a high reaction rate and under the mild temperature conditions required for obtaining a crystallographically homogeneous material completely free of organic impurities derived from diluent decomposition products will depend upon the desired degree of reduction of the transition metal component. Thus in cases where reduction of the transition metal to only the trivalent state is desired, as little as 5 vol. percent of aromatic constituents may be satisfactory, while in cases where a lower average valence state of the transition metal is desired a considerably larger proportion of aromatic components may be needed for carrying out the reduction under the mild conditions of this invention.

Although the exact mechanism by which aromatic compounds make it possible to carry out the reduction under very mild conditions and to an average valence state of the transition metal as low as about 2 is not known with certainty, it is believed that the aromatic compounds act as catalysts in the reduction by forming intermediate soluble complexes containing a partially reduced transition metal, aluminum, halogen and an aromatic compound. These complexes, which must be rather unstable, then decompose, either spontaneously or through reaction with unreduced transition metal tetrahalide, with formation of a cocrystalline transition metal-aluminum halide.

Actually, if a soluble complex containing an aromatic nucleus were not formed as an intermediate in the reduction reaction, it would seem impossible to explain the reduction of the transition metal to an average valence state of less than 3 with metallic aluminum under the extremely mild temperature conditions employed in the process of this invention. For instance, in the case of titanium chlorides, $TiCl_4$ is a hydrocarbon soluble liquid, while $TiCl_3$ as well as cocrystalline $TiCl_3 \cdot yAlCl_3$ are crystalline hydrocarbon insoluble solids, yet, properly activated aluminum powder, which is also insoluble in hydrocarbons, will quantitatively reduce $TiCl_4$ in the presence of aromatic hydrocarbons with formation of cocrystalline compositions such as $TiCl_{2.91} \cdot 0.364AlCl_3$, $$TiCl_{2.8} \cdot 0.4AlCl_3$$

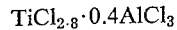

$TiCl_{2.67} \cdot 0.44AlCl_3$, etc. If a soluble complex were not formed, one would at most expect insoluble $TiCl_3$ to be formed at the surface of the aluminum powder as long as one were not operating above the temperature, about 195° C., at which aluminum powder will react quantitatively with $TiCl_4$ in the absence of a diluent. However, this invention is not limited by any particular explanation of a reaction mechanisim, but the catalytic action of aromatic compounds via soluble complexes in which the transition metal is in a partially reduced state, would explain why completely aliphatic diluents are not useful and why some aromatic constituents are required. It also would explain why the rate of reduction increases with increasing contents of aromatic constituents in the diluent.

Aliphatic hydrocarbon materials may be used in the diluent system provided that at least 5 vol. percent of the total diluent system is made up of aromatic diluents. In the preparation of the gamma crystalline modification of $TiCl_3$ cocrystallized with $AlCl_3$ the diluent system should contain at least about 50 volume percent of aliphatic materials and from 1 to 50, preferably 5 to 20 volume percent of aromatic materials. In the preparation of other types of titanium and vanadium halide cocrystallized catalyst, the diluent system used may be completely aromatic or can be an aromatic-aliphatic mixture wherein the aromatic portion may be a major or minor constituent.

The aliphatic hydrocarbon component of a mixture diluent system may be a straight chain, branched chain or cyclic material or mixtures thereof having from 6 to 20, preferably from 7 to 12 carbon atoms per molecule. Examples of useful aliphatic diluents include n-hexane, cyclohexane, n-heptane, isooctane, n-decane, n-dodecane and the like. The use of a diluent system containing at least minor amounts of aromatic hydrocarbons is necessary if substantially pure catalyst materials are to be formed at high conversions and at moderate temperatures. If the reduction is conducted in a completely aliphatic diluent, temperatures in excess of about 200° C. must generally be used in order to secure reduction of the heavy transition metal tetrahalide. At such elevated temperatures, the aliphatic diluent tends to be cracked because the rather acidic transition metal tetrahalide tends to catalyze the decomposition of the diluent resulting in the formation of oily or resinous materials which are difficult to remove from the catalyst components and usually have a bad influence on the properties of the material as a catalyst. If the diluent system contains at least minor amounts of aromatic constituents, tar formation is generally avoided as the reduction usually proceeds at lower temperatures and at very high rates of conversion. Furthermore, it is virtually impossible to secure complete reduction of the transition metal halide and to obtain a cocrystalline material in which the average valence state of the transition metal is less than 3 when the reduction is carried out in an aliphatic diluent unless a temperature well in excess of 200° C. is employed, and even if complete reduction of the transition metal tetrahalide is secured by operation at a temperature above about 250° C., the reaction product will not be homogeneous unless intense mixing or grinding is employed during the reaction or two reaction periods are employed with an intermediate homogenization (grinding) operation.

The reduction of titanium or vanadium tetrachlorides and tetrabromides to crystalline partially reduced titanium or vanadium chlorides and bromides cocrystallized with aluminum chloride or bromide including the gamma crystalline modification of $TiCl_3$ is carried out by forming a slurry of one mole of the titanium or vanadium tetrahalide and 0.3 to 0.67, preferably 0.33 to 0.45, atom of activated aluminum powder in 0.3 to 10, preferably 0.5 to 2 liters of a diluent system containing at least 5 vol. percent aromatic constituents and heating the resulting slurry to a temperature in the range of 100° to 250° C., preferably 125 to 195° C. at a pressure sufficient to maintain the diluent in liquid form. The molar ratio of aluminum compound to transition metal tetrahalide to be used in effecting the reduction will, of course, vary with the value of $x$ desired in the final cocrystallized $MX_x \cdot yAlX_3$ material. The following equations give a general representation of the chemical reactions involved in reducing either a titanium or vanadium tetrachloride or bromide to the range of $MX_{2.5-3.0}$.

EQUATION 1

$$TiCl_4 + (4-x)/3\,Al \rightarrow TiCl_x \cdot (4-x)/3\,AlCl_3$$

wherein $x$ varies from 2.5 to 3.0. As specifically applied for making $TiCl_{2.7}$ cocrystallized with aluminum chloride, the following equation will give the molar proportions:

EQUATION 2

$$30\,TiCl_4 + 13\,Al \rightarrow 30\,TiCl_{2.7} \cdot 13\,AlCl_3$$

The following table sets forth in detail the proportions to be used for making $MX_x$ wherein $x$ has any value from 2.5–3.0 when starting with either titanium or vanadium tetrachloride or tetrabromide and using activated aluminum powder as the sole reducing agent.

TABLE I.—TABLE OF MOLAR PROPORTIONS OF MATERIALS FOR MAKING $MX_{2.5-3.0}$

| $x$ | Starting materials | | Products | |
|---|---|---|---|---|
| | $MX_4$ | Al | $MX_x$ | $AlCl_3$ |
| 3.0 | 30 | 10 | 30 | 10 |
| 2.9 | 30 | 11 | 30 | 11 |
| 2.8 | 30 | 12 | 30 | 12 |
| 2.7 | 30 | 13 | 30 | 13 |
| 2.6 | 30 | 14 | 30 | 14 |
| 2.5 | 30 | 15 | 30 | 15 |

Generally, the molar proportion of activated aluminum powder to be used per 30 moles of titanium tetrachloride, titanium tetrabromide, or vanadium tetrachloride starting material is equal to $10(4-x)$.

Obviously it would be possible to obtain a material of the composition $MX_3 \cdot yAlX_3$ by employing less than 0.33 atom aluminum per mole of transition metal tetrahalide. Such an operation would, of course, not lead to complete or almost complete removal of the $TiCl_4$ and would not amount to a preferred embodiment of this invention. However, the application of less than 0.33 atom activated aluminum powder per mole of transition metal tetrahalide would still result in a very rapid reduction of the tetrahalide and in the formation of a crystallographically more homogeneous product than would be obtained under the same reaction conditions with commercial aluminum powder.

Formation of partially reduced titanium or vanadium halide co-crystallized with aluminum halide has been found to be substantially independent of the temperaure of reduction in the range of from about 50 to 250° C. when activated aluminum powder is used as the reducing agent and when a diluent system containing at least minor amounts of aromatic constituents is used provided the reaction time is properly adjusted. However, a final reaction temperature above about 100° C. is required for obtaining partially reduced titanium chloride containing materials having the preferred layer lattice structure. At lower temperatures, cocrystalline materials tend to be formed which have a fiber like structure reminiscent of that found in beta-$TiCl_3$. This is particularly the case when the conditions are such that the transition metal will assume an average valence of close to 3. Such materials are not particularly prefererd as catalyst components for polymerizing alpha olefins.

Since the reduction of the transition metal tetrahalide will normally proceed to completion at temperatures below about 100° C., while higher temperatures are often needed for obtaining the desired crystal structure, it is often advantageous to let the reduction occur at a lower temperature and then to raise the temperature to a level at which the conversion to the desired crystal structure will take place at a reasonable rate, e.g. within an hour or less. By using such a procedure one can prevent exposure of the diluent to highly acidic $MX_4$ at a higher temperature and thus make sure that no diluent decomposition will take place.

At higher reaction temperatures, i.e. at or close to 200° C., only brief reaction or heating times are necessary to form the desired crystalline product. Conversely, at lower reaction or heating temperatures, especially at or close to 100° C., relatively long reaction times are necessary to secure the desired crystalline material. The reaction is generally conducted for a time sufficient to produce substantially complete reaction of the activated aluminum powder and substantially complete conversion of the titanium or vanadium tetrahalide. The reaction time including the secondary heat treatment is not critical as far as the upper limit is concerned but will generally be in the range of from 0.25 to 24 hours, preferably 0.5 to 6 hours, depending upon the reduction or heat treatment temperature used. The reaction pressure is not critical; however, the transition metal tetrahalide reduction should be conducted at pressures sufficient to maintain the diluents used in the liquid state.

A preferred method for preparing the $MX_x \cdot yAlX_3$ catalyst component such as $TiCl_3 \cdot 0.33\,AlCl_3$ is to dissolve 1.5 moles of titanium tetrachloride in 1 liter of benzene at room temperature and then add 0.5 atom of highly activated aluminum powder and permit said reagents to react at a temperature and for a period of time sufficient to cause substantially complete reaction of the aluminum powder. Temperatures of from 125 to 200° C. and contact times ranging from 15 to 120 minutes may be used. Following this reaction, the catalyst component is recovered by filtration and is subsequently washed with an inert solvent such as an aliphatic hydrocarbon in order to remove traces of $TiCl_4$ which may still be present and then dried prior to use. However, when an $MX_x \cdot yAlX_3$ composition is prepared in which $x$ is less than 3, which is accomplished by using more than 0.33 atom of aluminum per mole of transition metal halide as indicated in Table I, no washing is necessary, and the reaction product can be recovered by filtration or decantation followed by drying. Under certain conditions $MX_x \cdot yAlX_3$ containing-slurries of the above type may be used directly for preparing the final complete catalyst composition.

The gamma crystalline modification of titanium chloride obtained as described above but in a diluent containing only a minor amount of aromatic constituents yields a characteristic X-ray diffraction pattern from which the interplanar $d$-spacings shown below can be calculated.

Interplanar $d$-spacings in gamma-$TiCl_3 \cdot XAlCl_3$ [a]

| $d$-Spacings A units [b]: | Relative intensity of X-ray diffraction peaks |
|---|---|
| 5.88 | Strong. |
| 5.30 | Weak-medium. |
| 5.11 | Medium. |
| 4.54 | Weak-medium. |
| 3.94 | Weak-medium. |
| 3.03 | Weak-medium. |
| 2.90 | Weak-medium. |
| 2.52 | Very strong. |
| 1.95 | Weak. |
| 1.77 | Strong. |
| 1.70 | Weak-medium. |
| 1.65 | Very weak. |

[a] Only the $d$-spacings giving more prominent peaks either with respect to strength or position have been included.
[b] Because of a slight variation in unit cell dimensions with variation in $AlCl_3$ content, a slight deviation from these values may occur. Furthermore, the precision of routine measurements may not be better than ±0.04 A., particularly for the larger $d$-spacings.

The use of partially reduced transition metal halides cocrystallized with aluminum halides as catalyst components for promoting the polymerization of alpha olefins and diolefins is well known. According to accepted procedures, the partially reduced cocrystallized catalyst component present in the original reaction mixture obtained as described above can, if free of unreduced tetrahalide, be treated directly with an organometallic compound to activate the transition metal halide constituent of the catalyst component. Preferably, the partially reduced transition metal halide cocrystallized with aluminum halide is first isolated from the reaction mixture, such as by filtration, preferably at a temperature close to that employed in the reaction, dried and then pebble milled or preferably steel ball milled and thereafter slurried in a hydrocarbon diluent and treated with an organometallic compound.

A large number of organometallic compounds can be used to activate the cocrystalline material. The most valuable are the alkylaluminum compounds such as triethylaluminum, tripropylaluminum, diethylaluminum chloride, diethylaluminum iodide, and mixtures thereof. The partially reduced transition metal halide cocrystallized with aluminum halide is treated in a nonoxidizing atmosphere with one or more of the above organometallic compounds in a molar ratio of 0.1 to 6 moles of organometallic compounds per mole of transition metal halide catalyst component.

Typically, the homopolymerization or copolymerization of $C_2$ to $C_{20}$ alpha olefins is effected by contacting the alpha olefin or alpha olefin mixture with the alkyl aluminum activated partially reduced transition metal halide cocrystallized with aluminum halide in a hydrocarbon solvent at a temperature of 0 to 150° C. at pressures ranging from about 0 to 250 p.s.i.g. in a batch or continuous operation. When the desired degree or amount of monomer conversion to polymer has been secured, $C_1$ to $C_8$ alcohols such as isopropanol, desirably in combination with a chelating agent such as acetylacetone, is added to the reaction mixture to dissolve and deactivate the catalyst and to precipitate the polymer product from solution. The polymer product is then filtered, washed with alcohol and/or acid such as hydrochloric acid, dried, compacted, and packaged. It is important that the polymerization reaction be conducted in the relative absence of catalyst poisons such as water, oxygen, sulfur compounds and the like.

This invention will be better understood from the following examples.

EXAMPLE 1

Preparation of highly activated aluminum powder

An activated aluminum powder was prepared by milling 324 grams of aluminum powder (Alcoa Grade 123—average particle size of 16 microns) with 133.4 grams of aluminum chloride (Al/AlCl$_3$ molar ratio of 12:1) in a ½ gallon stainless steel jar with ⅝" diameter chrome alloy steel balls being employed as the grinding medium. The milling operation was continued for four days after which time a mixture of aluminum and aluminum chloride appearing in a finely divided state and having the characteristic color of aluminum was obtained.

After the grinding operation, substantially pure activated aluminum powder was secured using the following technique. A 152.4 gram aliquot of the milled aluminum-aluminum chloride mixture was slurried in 350 ml. of n-heptane contained in a dry, nitrogen-blanketed, 4-necked, 1-liter reaction flask which was equipped with stirrer, addition funnel, thermometer well and reflux condenser. To the mixture contained in the reaction flask was added 400 ml. of dry n-heptane containing 76.1 grams of dissolved triethyl aluminum. This addition was completed with continuous stirring over a period of eight minutes. During the time when the triethyl aluminum was added to the reaction flask, the temperature of the flask contents rose from 26 to 36° C. due to the reaction between the aluminum chloride and triethyl aluminum. The reaction mixture was then stirred for one hour whereupon it was filtered in a dry box. The recovered material was then washed with several portions of dry n-heptane and dried in vacuo on a steam bath. A quantitative yield of substantially pure activated aluminum powder was obtained.

EXAMPLE 2

Preparation of TiCl$_3$·0.33AlCl$_3$ components with activated and unactivated aluminum powders A series of experiments were carried out to demonstrate the superiority of aluminum powder activated according to Example 1 over unactivated aluminum powder for the reduction of TiCl$_4$ to TiCl$_3$·0.33AlCl$_3$ in an at least partially aromatic diluent. The procedure used in these experiments was as follows:

A 4-necked, 2-liter reaction flask equipped with stirrer, reflux condenser and thermowell was charged inside a nitrogen-containing dry box with the following reagents: 189.7 grams (1 mole) TiCl$_4$, 9 grams (⅓ atom) aluminum powder, and 500 ml. (except for 750 ml. in one case) diluent. The flask was then transferred to a hood and set up with its auxiliary equipment in such a manner that the reaction mixture remained blanketed with dry nitrogen. Thereafter heat was applied and the reaction mixture was allowed to reflux for 1 hour. The contents of the flask were then filtered in a dry box, thoroughly washed with dry n-heptane and dried in vacuo on a steam bath.

From the data presented in Table II it can be clearly seen that the results obtained with activated aluminum powder in diluents containing aromatic constituents (Runs 2, 4 and 5) were far superior to those obtained with unactivated, commercial aluminum powder (Runs 1 and 3). Not only did the unactivated powder give inferior yields, but its use also resulted in impure products which did not have the desired composition TiCl$_3$·0.33AlCl$_3$, particularly in benzene diluent. Furthermore, the slow reaction rate with unactivated aluminum powder prevented the reaction product obtained in xylene from obtaining the heat treatment required for assuming the desired layer lattice structure within the reaction period employed (Run 3), even though the reflux temperature, 138° C., was high enough to cause conversion of any fiber-like beta-structure initially formed into the layer lattice type gamma- and alpha-structures as shown by the results of Run 4.

The difference in reactivity between the activated and unactivated aluminum powders was actually considerably more striking than suggested by the results presented in Table II. Thus while very little total reaction occurred between the unactivated aluminum powder and TiCl$_4$ in benzene diluent (Run 1) a very vigorous reaction started at room temperature in the corresponding experiment with activated aluminum powder (Run 2). In the latter case, the flask had to be removed from the dry box very rapidly after the chemicals had been charged and cooled in an ice bath. In spite of this, the temperature rose to 64° C. in 7 minutes. The decision to use 750 ml. diluent in this case instead of the 500 ml. used in the other cases was made in order to prevent the flask contents from starting to boil before the complete assembly could be set up in the hood.

The failure of the activated aluminum powder to reduce TiCl$_4$ in refluxing n-decane at about 157° C., except for forming a layer of TiCl$_3$ at its surface, clearly demonstrates that both a partially aromatic diluent and a highly activated aluminum powder are needed for the facile reduction of TiCl$_4$ according to this invention.

Lastly, Run 5 illustrates that when a diluent mixture containing major amounts of aliphatic material (n-decane) and a minor amount of an aromatic solvent (xylene) is used in conjunction with highly activated aluminum powder, substantially pure gamma titanium trichloride cocrystallized with AlCl$_3$ was formed in quantitative yields.

TABLE II.—PREPARATION OF TiCl₃ CONTAINING CATALYST COMPONENTS BY REDUCING TiCl₄ WITH ACTIVATED AND UNACTIVATED ALUMINUM POWDER

|  | Run | | | | | |
|---|---|---|---|---|---|---|
|  | 1 | 2 | 3 | 4 | 5 | 6 |
| Diluent | Benzene | Benzene ᵃ | Xylene | Xylene | n-Decane/xylene (9 vol./1 vol.) | n-Decane |
| Aluminum powder ᵇ | Unactivated | Activated | Unactivated | Activated | Activated | Activated. |
| Reaction conditions: | | | | | | |
| Reflux temperature, °C | 82 | 81.5 | 138 | 138.5 | 163 | 157. |
| Time at reflux temp., hours | 1.6 | 1 | 1 | 2 | 0.5 | 1. |
| Results: | | | | | | |
| Yield, g.ᶜ | 38.3 | 184.2 | 161.8 | 185.2 | 184.0 ᵈ | 33.7. |
| Color | Brown | Yellowish-brown | Purplish-brown | Purple | Bright lilac | Purple violet. |
| Crystal structure ᵉ | βᶠ | β | β-(γ) | α-γ | γ | |

ᵃ 750 ml. diluent used instead of 500 ml.
ᵇ The unactivated aluminum powder was Alcoa #123, the activated powder was prepared according to the procedure of Example 1.
ᶜ After washing and drying. The theoretical yield was 198.7 grams.
ᵈ Refluxed for only 0.5 hour.
ᵉ As compared with α, β, and γ-TiCl₃ and determined by visual inspection of X-ray diffraction pattern. When two crystal structures are shown, the order of increasing strength is indicated as follows: (α), α, $\underline{\alpha}$.
ᶠ Also strong peaks for metallic aluminum.

EXAMPLE 3

Polymerization of propylene with unmilled TiCl₃·0.33AlCl₃ catalyst components

Propylene polymerizations with the cocrystalline catalyst components obtained according to Example 2, Runs 3, 4 and 5, were carried out as follows:

A 1.98 gram aliquot of the solid catalyst component was mixed with 1.91 grams triethylaluminum (AlEt₃) and 100 ml. dry xylene in an additional funnel inside a nitrogen-containing dry box and allowed to stand for 10 minutes. The mixture was then added to a 2 liter nitrogen blanketed stirred glass reactor containing 900 ml. of dry xylene at room temperature. Dry purified propylene (scrubbed with Drierite, BaO, and 25% AlEt₃ in Bayol D), was then introduced at a rate of 2000 ml./min. and heat applied to the reactor in such a manner that the temperature increased at a constant rate until 80° C. was reached after 30 minutes. The polymerization was then continued at this temperature for 90 minutes or a total of 2 hours after the catalyst addition, whereupon it was terminated by the addition of 10 ml. acetylacetone and 2 volumes (2 liters) of isopropanol. This caused the partly solvated solid polymer to separate from solution. The polymer slurry was then heated with stirring to 75° C. in a separate container and maintained at this temperature for about 30 minutes. The product was filtered off at 50° C. The solid polymer was reslurried in 1 liter of isopropanol, reheated to 75° C. for 15 minutes with stirring and again filtered at 50° C. and washed with a small amount of isopropanol in the filter funnel. A suitable oxidation inhibitor was then added to the polymer by slurrying it at room temperature in an acetone solution of the inhibitor followed by filtration. Finally, the solid polymer was dried in vacuo at about 50° C.

The waxy polymer soluble in the diluent-alcohol mixture under the conditions used for recovering the solid polymer was separated from the catalyst residues after evaporation of the combined filtrates.

The superiority of the preparations made with activated aluminum powder (Runs 4 and 5 of Example 2) over that made with unactivated powder as polymerization catalyst components is strikingly evident from the results presented in Table III. The former preparations did not only promote the formation of more polymer than the preparation made (in a significantly lower yield) with unactivated powder, but it also produced polymers of better physical properties.

TABLE III.—POLYMERIZATION OF PROPYLENE WITH UNMILLED TiCl₃·0.33AlCl₃ CONTAINING CATALYSTS

|  | Run | | |
|---|---|---|---|
|  | 1 | 2 | 3 |
| Solid catalyst component | Example 2, Run 3 | Example 2, Run 4 | Example 2, Run 5 |
| Results: | | | |
| Total yield, grams | 67.8 | 114.2 | 93.5 |
| Waxy polymer, percent | 4.6 | 1.0 | 4.5 |
| Properties of solid polymer: | | | |
| Molecular weight×10⁻³ ᵃ | 450 | 530 | 555 |
| Tensile strength, p.s.i. | 3,750 | 3,940 | 4,250 |

ᵃ According to the Kinsinger correlation (Thesis, University of Pennsylvania, 1957).

EXAMPLE 4

Polymerization of propylene with ball milled TiCl₃·0.33AlCl₃ catalyst components To realize more fully the high potential catalyst efficiency of the solid catalyst components prepared with activated aluminum powder as described in Example 2, 150 gram aliquots of the preparations made in Runs 4 and 5 were dry milled under inert conditions for 6 days in a 1.02 liter stainless steel jar which rotated at 80 r.p.m. using ⅝″ chrome alloy steel balls as the grinding medium. For comparative purposes a 150 gram aliquot of the preparation made with unactivated aluminum powder in xylene according to Run 3 was similarly milled.

Polymerization experiments were then carried out by mixing a 0.5 gram aliquot of each ball milled preparation with 0.475 gram of triethyl aluminum and 100 ml. xylene in an addition funnel in a manner similar to that described in Example 3. Each catalyst mixture was then added to a 2 liter stirred glass reactor which contained 900 ml. of propylene-saturated xylene at 60° C. The temperature was raised to 75° C. in 10 minutes while monomer was being continuously added. The polymerization was continued for 50 minutes at this temperature or for a total of 1 hr. after the catalyst addition.

The polymer obtained in each of the three experiments was recovered as described in Example 3, except that only 2–3 ml. of acetylacetone were added to facilitate the catalyst removal from the solid polymer.

The results reported in Table IV clearly demonstrate the high activity of the catalyst components made with activated aluminum powder and their superiority over the preparation made with unactivated powder.

TABLE IV.—POLYMERIZATION OF PROPYLENE WITH CATALYSTS CONTAINING BALL MILLED TiCl₃·0.33AlCl₃

|  | Run | | |
|---|---|---|---|
|  | 1 | 2 | 3 |
| Solid catalyst component | Example 2, Run 3 | Example 2, Run 4 | Example 2, Run 5 |
| Results: |  |  |  |
| Total yield, grams | 63.9 | 112.6 | 126.9 |
| Waxy polymer, percent | 6.7 | 2.8 | 4.3 |
| Properties of solid polymer: |  |  |  |
| Molecular weight×10⁻³ [a] | 480 | 610 | 575 |
| Tensile strength, p.s.i. | 4,080 | 3,820 | 3,800 |

[a] According to the Kinsinger correlation (Thesis, University of Pennsylvania, 1957).

EXAMPLE 5

Polymerization of ethylene, 1-butene and 1-hexene with catalyst containing ball milled TiCl₃·0.33AlCl₃

The general utility of a TiCl₃·0.33AlCl₃ catalyst component prepared according to the method of this invention as a catalyst component for polymerizing alpha olefins was demonstrated in three experiments involving the use of ethylene, 1-butene and 1-hexene as the monomers. The polymerization procedure employed was essentially the same as for Example 4, Run 2, except that the dry 1-hexene monomer had to be added in liquid form from an addition funnel and that this polymerization was extended over a period of 2 hours. The rate of addition of this monomer as well as the results of the three polymerizations are given in Table V.

The good high polymer yields obtained in all cases clearly demonstrate the general usefulness of the catalyst components prepared according to this invention.

TABLE V.—POLYMERIZATION OF ALPHA OLEFINS WITH CATALYST CONTAINING BALL MILLED TiCl₃·0.33AlCl₃ COMPONENT

|  | Run | | |
|---|---|---|---|
|  | 1 | 2 | 3 |
| Olefin | Ethylene | 1-butene | 1-hexene [a] |
| Polymerization conditions: |  |  |  |
| Time, hours | 1 | 1 | 2 |
| Temperature, °C | 75 | 75 | 75 |
| Results: |  |  |  |
| Polymer yield, grams | 104.8 | 112.8 | 127.1 |
| Low mol. wt. polymer, percent [b] |  | 3.0 | 0.3 |
| Properties of high mol. wt. polymer: |  |  |  |
| Molecular weight×10⁻³ | [c] 2,400 | [d] 320 | [d] 370 |
| Density, g./cc | 0.935 | 0.876 |  |

[a] The monomer was added as follows: 100 g. at the beginning, 50 g. between 30 and 45 minutes, and 17 g. between 45 and 60 minutes of the reaction.
[b] Corresponds to waxy polymer for polypropylene.
[c] According to the Harris correlation (J. Polymer Sci. 8, 353 (1952)).
[d] According to the Kinsinger correlation for polypropylene (Thesis, Univ. of Pennsylvania, 1957), hence a low value.

EXAMPLE 6

Preparation and testing of TiCl₃·0.33AlCl₃ catalyst components made by reduction of TiCl₄ with activated 16Al-TiCl₃·0.33AlCl₃

A purple TiCl₃·0.33AlCl₃ preparation having primarily the structure of alpha-TiCl₃ was first prepared according to the procedure of Example 2, Run 4. A mixture containing activated aluminum powder was then prepared by ball milling 324 grams (12 atoms) aluminum powder (Alcoa #123) with 149.1 grams of the purple TiCl·0.33AlCl₃ preparation. Aside from the difference in charge, the milling conditions were the same as described in Example 1. At the end of the milling period a quantitative yield was obtained of a finely divided purplish powder having the composition 16Al-TiCl₃·0.33AlCl₃.

Aliquots of this powder were then used for reducing TiCl₄ to TiCl₃ in different aromatic diluents according to the general procedure described in Example 2. However, since the halide used in the grinding, i.e. purple cocrystalline TiCl₃·0.33AlCl₃, was not removed, 13.15 grams of the activated 16Al-TiCl₃·0.33AlCl₃ mixture were used instead of 9 grams of pure aluminum powder for reducing 189.7 grams (1 mole) of TiCl₄.

A vigorous reaction started at room temperature in all cases just as in the experiments involving activated aluminum powder in completely aromatic diluents described in Example 2. The flask containing benzene diluent had to be rapidly removed from the dry box and cooled in an ice bath to prevent boiling of the diluent before the complete apparatus could be assembled in a hood.

From the data presented in Table VI it can be readily seen that very good yields of cocrystalline TiCl₃·0.33AlCl₃ were obtained in all cases and that the yield increased with increasing boiling point of the diluent. As could be expected, only the two higher boiling diluents, xylene and tetralin, gave cocrystalline purple to violet products having highly desirable layer lattice structure. Of the latter two, the higher boiling one, tetralin, gave a product having exclusively alpha-structure, which agrees with the well-established fact that more drastic heating conditions with respect to temperature and/or time are required for the formation of this crystallographic modification than for the formation of the gamma-form.

The X-ray diffraction patterns did not indicate any presence of TiCl₃·0.33AlCl₃ having randomly stacked chlorine layers as in the delta-form. The latter modification is normally formed during extensive dry grinding of the alpha- and gamma-forms, but it is likely that the heat treatment given to it during the subsequent reduction resulted in a restoration of the ordered alpha- or gamma-structure. It is also possible that the small amount (4.15 g.) of dry milled TiCl₃·0.33AlCl₃, which has very weak and diffuse diffraction peaks, will not be detectable when mixed with about 185 g. of the strongly diffracting alpha- and gamma-forms. However, the appearance of a small amount of gamma-structure in the preparation made in benzene would be explainable on the basis of a transformation from delta- to gamma-structure in the grinding aid during the heating.

TABLE VI.—PREPARATION OF TiCl₃·0.33AlCl₃ CATALYST COMPONENTS BY REDUCING TiCl₄ WITH ACTIVATED 16Al-TiCl₃·0.33AlCl₃ MIXTURE

|  | Run | | |
|---|---|---|---|
|  | 1 | 2 | 3 |
| Diluent | Benzene | Xylene | Tetralin |
| Reflux temperature, °C | 82 | 138 | 182 |
| Results: |  |  |  |
| Yield, g.[a] | 185.6 | 188.3 | 191.4 |
| Color | Yellowish-brown | Bright lilac | Purple violet |
| Crystal structure [b] | β-(γ) | α-γ | α |

[a] After washing and drying. The theoretical yield was 202.9 g.
[b] See Table II, footnote (e).

When tested in propylene polymerizations, either in dry milled (150 g. in a 1.02 liter jar for 6 days as described in Example 4) or in unmilled form, the two purple-violet preparations made at a reflux temperature above 100° C. (Runs 2 and 3) and having the desired layer lattice structure exhibited very high activity while the brown preparation made in benzene at 82° showed only moderate activity. Results of polymerizations with ball milled samples of the three catalyst components are shown in Table VII.

TABLE VII.—POLYMERIZATION OF PROPYLENE WITH CATALYSTS CONTAINING BALL MILLED TiCl₃·0.33AlCl₃

|  | Run | | |
|---|---|---|---|
|  | 1 | 2 | 3 |
| Solid catalyst component | Example 6, Run 1 | Example 6, Run 2 | Example 6, Run 3 |
| Results: |  |  |  |
| Total yield, g | 71.6 | 114.5 | 131.3 |
| Waxy polymer, percent | 5.9 | 4.1 | 3.2 |
| Catalyst efficiency, g./g | 73.4 | 117.5 | 135.0 |
| Properties of solid polymer: |  |  |  |
| Molecular weight×10⁻³ [a] | 490 | 530 | 470 |
| Density, g./cc | 0.8975 | 0.8975 | 0.8971 |
| Tensile strength, p.s.i. | 4,260 | 4,330 | 3,960 |

[a] According to the Kinsinger correlation (Thesis, University of Pennsylvania, 1957).

EXAMPLE 7

Preparation of mixed valence state $TiCl_x \cdot yAlCl_4$ catalyst components A series of experiments were carried out in which $TiCl_4$ was reduced with activated aluminum powder in benzene or xylene under conditions which would lead to preparations in which the titanium would have an average valence of between two and three, provided complete reaction of the aluminum could be secured. The procedure employed in the experiments was the same as described in Example 2, although more aluminum powder was employed per mole of $TiCl_4$ and the refluxing time was varied from 0.5 to 2 hours, as shown in Table VIII.

As in the previously described examples involving activated aluminum powder, a vigorous reaction started at room temperature in all experiments and rapid cooling had to be applied to prevent boiling of the benzene diluent in Run 2 before the complete reaction apparatus could be assembled in a hood. Complete removal of free $TiCl_4$ from the reaction system occurred in all cases within 1 or 2 minutes after the refluxing had started as evidenced by the complete disappearance of the yellow color from the reflux.

Since, as a consequence of the complete and early removal of $TiCl_4$, neither this compound nor diluent decomposition products were present in the reaction mixture, washing of the solid cocrystalline $TiCl_x \cdot yAlCl_3$ compounds was not considered necessary. Some of the solid components were therefore recovered by decanting off the supernatant diluent followed by drying in vacuo directly in the reaction flask.

From the data presented in Table VIII it can be seen that close to theoretical yields were obtained in all cases and particularly when the solid components had been recovered without washing. It should also be noted that cocrystalline compositions exhibiting layer lattice structure were obtained in all cases except when benzene was used as the diluent. This agrees with the observation made previously for $TiCl_3 \cdot yAlCl_3$ components that a heat treatment temperature above about 100° C. is necessary for reasonably rapid and complete formation of layer lattice type compositions.

propylene. The polymerization procedures used were the same as described in Examples 3 and 4 for unmilled and milled catalyst components, respectively, although the amounts of the individual components were so adjusted in weight that the milled and unmilled catalysts would still contain 2.5 and 10 atoms of titanium, respectively, and the (total-Al)/Ti ratio would remain at two.

The very high activity of unmilled cocrystalline $TiCl_{2.8} \cdot 0.4AlCl_3$ components exhibiting layer lattice structure is clearly demonstrated by the data presented in Table IX. The high polymer yield obtained in Run 2 also demonstrates that $TiCl_x \cdot yAlCl_3$ catalyst components prepared according to the procedure of this invention are free of surface contaminants and can be recovered without any washing.

The considerably lower yield of a polymer of significantly poorer physical properties obtained in Run 1 further illustrates the importance of preparing the solid cocrystalline catalyst components under conditions which will lead to the formation of purple-violet layer lattice type materials.

TABLE IX.—POLYMERIZATION OF PROPYLENE WITH CATALYSTS CONTAINING UNMILLED $TiCl_{2.8} \cdot 0.4AlCl_3$ COMPONENTS

| | Run | | |
|---|---|---|---|
| | 1 | 2 | 3 |
| Catalyst: | | | |
| Solid component: | | | |
| Preparation, Example 7, Run | 2 | 3 | 4 |
| Weight, grams | 2.00 | 2.00 | 2.00 |
| AlEt₃, grams | 1.82 | 1.82 | 1.82 |
| Results: | | | |
| Total yield, grams | 96.6 | 171.2 | 145.9 |
| Waxy polymer, percent | 5.8 | 1.3 | 0.5 |
| Catalyst efficiency, g./g. | 25.0 | 44.3 | 37.8 |
| Properties of solid polymer: | | | |
| Molecular weight ×10⁻³ [a] | 400 | 605 | 640 |
| Tensile strength, p.s.i. | 2,670 | 3,760 | 3,860 |

[a] According to the Kinsinger correlation (Univ. of Pennsylvania, 1957).

The very high activity of the cocrystalline $TiCl_x \cdot yAlCl_3$ preparations was shown even more strikingly in the polymerizations with ball milled preparations (Table X). The ball milling was carried out essentially as described TABLE VIII.—PREPARATION OF MIXED VALENCE STATE $TiCl_x \cdot yAlCl_3$ CATALYSTS

| | Run | | | | | | |
|---|---|---|---|---|---|---|---|
| | 1 | 2 | 3 | 4 | 5 | 6 | 7 |
| | $TiCl_x \cdot yAlCl_3$ to be formed | | | | | | |
| | $TiCl_{2.91} \cdot 0.364AlCl_3$ | | $TiCl_{2.8} \cdot 0.4AlCl_3$ | | | | $TiCl_{2.67} \cdot 0.45AlCl_3$ |
| Diluent | Xylene | Benzene | Xylene | Xylene | Xylene | Xylene | Xylene |
| Starting materials, moles: | | | | | | | |
| TiCl₄ | 1 | 1 | 1 | 1 | 1 | 1 | 1 |
| Al | 4/11 | 0.4 | 0.4 | 0.4 | 0.4 | 0.4 | 4/9 |
| Reaction conditions: | | | | | | | |
| Reflux temperature, °C. | 138 | 81 | 138 | 138.5 | 138.5 | 138 | 138 |
| Time at reflux temp., hrs. | 2 | 1 | 0.5 | 1 | 2 | 2 | 2 |
| Washing of solid component | No | Yes | No | Yes | No | Yes | No |
| Yield: | | | | | | | |
| Recovered, grams [a] | 195.1 | 184.4 | 196.9 | 184.7 | 195.5 | 193.2 | 198.2 |
| Theoretical, grams | 199.5 | 200.5 | 200.5 | 200.5 | 200.5 | 200.5 | 201.7 |
| Color of product | [b] | [c] | [d] | [d] | [b] | [d] | [b] |
| Crystal structure [e] | (α)-γ | (β-)γ | γ | (α)-γ | (α)-γ | (α)-γ | (α)-γ |

[a] After washing (when performed) and drying.
[b] Bright purple.
[c] Yellowish-brown.
[d] Purple.
[e] As determined from visual inspection of X-ray diffraction pattern and comparison with the known patterns for α-, β-, and γ-TiCl₃. When two crystal structures are shown, the order of increasing strength is indicated in the following manner: (α), α, α. Because of the deviation in composition from TiCl₃, these data decrease in significance as the valence state of the titanium decreases.

EXAMPLE 8

Polymerization of propylene with $TiCl_x \cdot yAlCl_3$ catalyst components

The cocrystalline $TiCl_x \cdot yAlCl_3$ components prepared as described in Example 7 were tested both before and after ball milling as catalysts for polymerization of in Example 4, although the charge for each preparation was the total yield reported in Table VIII minus 15 g. The individual charges varied therefore from about 170 g. to about 185 g. Since milling efficiency increases considerably with decreasing mill charge in the range of 200–150 g., the cocrystalline preparations, and particularly those recovered in very high yields without washing, were given a less intense (by about 10%) activation than the preparations ball milled with a 150 g. charge in a 1.02 liter jar. Even so, the polymer yield data reported in Table X for cocrystalline $TiCl_x \cdot yAlCl_3$ components of layer lattice structure compare well with the data presented for ball milled $TiCl_3 \cdot 0.33AlCl_3$ components in Tables IV and VII. A comparison of Runs 6 and 7, as well as 8 and 9, shows that washing of solid mixed valence state catalyst components made according to this invention has no beneficial effect and is unnecessary.

By comparison a similar experiment in which inactivated aluminum powder (Alcoa #123) was employed yielded a very thick slurry which was very difficult to handle. The reaction was also incomplete as evidenced by the low yield (261.8 grams) and the presence of free $TiCl_4$ in the diluent after the reaction.

A 175 gram sample of the dried $TiCl_{2.91} \cdot 0.364AlCl_3$ was ball milled for 6 days under the conditions described in Example 4. A 0.499 gram aliquot was used together with 0.468 gram of triethyl aluminum as a catalyst for polymerization of propylene according to the procedure TABLE X.—POLYMERIZATION OF PROPYLENE WITH CATALYSTS CONTAINING BALL MILLED $TiCl_x \cdot yAlCl_3$ COMPONENTS

| | Run | | | | | | |
|---|---|---|---|---|---|---|---|
| | 4 | 5 | 6 | 7 | 8 | 9 | 10 |
| Catalyst: | | | | | | | |
| Solid component | $TiCl_{2.9} \cdot 0.36AlCl_3$ | $TiCl_{2.8} \cdot 0.4AlCl_3$ | | | | $TiCl_{2.67} \cdot 0.45AlCl_3$ | |
| Preparation, Ex. 7, Run | 1 | 2 | 3 | 4 | 5 | 6 | 7 |
| Weight, grams | 0.499 | 0.501 | 0.501 | 0.501 | 0.501 | 0.501 | 0.504 |
| AlEt$_3$, grams | 0.468 | 0.465 | 0.465 | 0.456 | 0.456 | 0.456 | 0.444 |
| Results: | | | | | | | |
| Total yield, grams | 97.9 | 65.4 | 126.4 | 133.3 | 110.5 | 108.1 | 102.2 |
| Waxy polymer, percent | 1.9 | 1.7 | 3.5 | 3.4 | 1.4 | 1.9 | 1.7 |
| Catalyst efficiency, g./g. | 101.2 | 68.3 | 132.2 | 139.3 | 115.7 | 113.5 | 107.9 |
| Properties of solid polymer: | | | | | | | |
| Molecular weight×10$^{-3}$ [a] | 475 | 480 | 520 | 485 | 570 | 490 | 590 |
| Tensile strength, p.s.i. | 3,590 | 3,430 | 3,730 | 3,720 | 3,540 | 3,680 | 3,620 |

[a] According to the Kinsinger correlation (Thesis, University of Pennsylvania, 1957).

EXAMPLE 9

Preparation and testing of $TiCl_{2.8} \cdot 0.48AlCl_3$ component

An activated $Al-0.202AlCl_3$ mixture was first prepared by milling 75 grams of aluminum powder (Alcoa #101) together with 75 grams of $AlCl_3$ in a 1.02 liter stainless steel jar for 6 days.

A 21.6 gram aliquot of this mixture corresponding to 10.8 grams of aluminum was then used for reducing one mole of $TiCl_4$ in 0.5 liter of xylene according to the procedure described in Example 2 but with refluxing time of only 0.5 hour at 138.5° C.

After the usual washing and drying procedure, 191.3 grams of bright purple cocrystalline $TiCl_{2.8} \cdot 0.48AlCl_3$ were recovered as compared to a theoretical yield of 211.3 grams.

This cocrystalline preparation was then tested both in unmilled and ball milled form for propylene polymerization under the conditions described in Example 8. The yield obtained in 2 hours with a catalyst consisting of 2.11 grams of the unmilled preparation and 1.74 gram of triethyl aluminum amounted to 99.9 grams of polymer of which 1.6% was of the waxy type. The solid polymer had a viscosity average molecular weight of 545,000 and was highly crystalline as evidenced by its high density, 0.9014 gram/cc. and tensile strength, 4210 p.s.i.

EXAMPLE 10

Preparation of $TiCl_{2.91} \cdot 0.364AlCl_3$ catalyst component in benzene at elevated pressure and testing of same A 2 liter autoclave equipped with a magnetically activated reciprocating agitator was charged with 1 liter of benzene, 284.6 grams (1.5 mole) of $TiCl_4$ and 14.7 grams (6/11 atom) of activated aluminum powder prepared as described in Example 1. The autoclave was then heated to 200° C. for 2 hours at an internal pressure of about 180 p.s.i.g. The reaction product was then recovered from the fine granular slurry without washing. The yield amounted to 283.5 grams of lilac-brown $$TiCl_{2.91} \cdot 0.364AlCl_3$$

having a typical layer lattice structure.

of Example 8, Run 4. The yield amounted to 105.4 gram of solid and 2.7 grams of waxy polymer. The solid polymer had a viscosity average molecular weight of 580,000 and a tensile strength of 3500 p.s.i.

EXAMPLE 11

Preparation of $TiBr_x \cdot yAlBr_3$ components

The ability of activated aluminum powder prepared as described in Example 1 to reduce $TiBr_4$ according to the method of this invention either to $TiBr_3$ or to $TiBr_x$ where x is between 2 and 3 is demonstrated in two experiments, which were carried out with 0.5 liter of benzene or xylene diluent essentially as described in Examples 2 and 7. Details of the experiments are given in Table XI.

A reduction reaction started at room temperature in both cases, but it was not as vigorous as in the corresponding examples involving $TiCl_4$, which was expected since only ½ mole $TiBr_4$ was used as compared to one mole in the $TiCl_4$ experiments. In Run 2 where sufficient aluminum powder was added to reduce the $TiBr_4$ to $TiBr_{2.91}$, complete reduction of the $TiBr_4$ was obtained after a few minutes at the refluxing temperature as evidenced by the colorless refluxing diluent.

The yields obtained after filtration and washing with n-heptane (if used) followed by drying in vacuo were not quantitative if calculated as the theoretical $$TiBr_x \cdot yAlBr_3$$

compositions. However, $AlBr_3$ is vastly more soluble than $AlCl_3$ in hydrocarbon diluents. It also has a lower tendency to cocrystallize with $TiBr_x$ than $AlCl_3$ with $TiCl_x$. Hence, most of the $AlBr_3$ will tend to be removed with the diluent during the recovery procedure. The yields were practically theoretical if this is taken into account.

Both $TiBr_x \cdot yAlBr_3$ preparations were tested together with triethyl aluminum and found active for polymerization of both ethylene and propylene. However, more interesting results were obtained in butadiene polymerizations. A catalyst made up from 36.0 milligrams of a 6-day ball milled sample of the solid from Run 1 and 28.5 milligrams of triethyl aluminum (AlEt$_3$/TiBr$_3$ ratio=2) was used for polymerizing 100 grams of 1,3-butadiene in 500 ml. benzene diluent at 25° C. After 48 hours, 81.4 grams of rubbery polybutadiene having a viscosity average molecular weight of 235,000 was obtained. Infrared analysis of the unsaturation showed that 95.0% of the unsaturation was derived from cis-1,4 addition.

TABLE XI.—PREPARATION OF TiBr$_x$·yAlBr$_3$ COMPONENTS

|  | Run | |
|---|---|---|
|  | 1 | 2 |
|  | TiBr$_x$·yAlBr$_3$ to be formed | |
|  | TiBr$_3$·0.33AlBr$_3$ | TiBr$_{2.91}$·0.364AlBr$_3$ |
| Diluent | Benzene | Xylene |
| Starting materials: |  |  |
|   TiBr$_4$, mole | ½ | ½ |
|   Al, atom | ¼ | 2/11 |
| Reaction conditions: |  |  |
|   Reflux temperature, °C | 81 | 139.5 |
|   Time at reflux temperature, hours | ¼ | ½ |
|   Washing of solid component | Yes | No |
| Yield: |  |  |
|   Recovered, grams [a] | [b] 149.1 | [c] 147.7 |
|   Theoretical, grams | 188.3 | 189.7 |
| Crystal Structure | [d] | [d] |

[a] After washing (when performed) and drying.
[b] Almost complete removal of AlBr$_3$ occured during washing and drying of the solid component. The calculated final composition was TiBr$_3$·0.04AlBr$_3$.
[c] Although preparation was not washed, most of the AlBr$_3$ was removed with the diluent and during the drying. The calculated final composition was TiBr$_{2.9}$·0.05AlBr$_3$.
[d] β-TiBr$_3$.

EXAMPLE 12

Preparation of VCl$_3$·0.33AlCl$_3$ catalyst component and testing of same

A cocrystalline VCl$_3$·0.33AlCl$_3$ catalyst component was prepared by reducing 96.5 grams (½ mole) of VCl$_4$ in 500 milliliters of xylene diluent with 4.5 grams (⅙ atom) of aluminum powder activated as described in Example 1. The general procedure was the same as used for the corresponding titanium chloride preparations in Example 2. A vigorous reaction started at room temperature and the temperature rose to over 100° C. before any heat was applied to the reaction flask.

The yield obtained after thorough washing followed by drying in vacuo amounted to 95.4 grams of a brownish violet fine powder exhibiting a typical layer lattice structure. An 85 gram aliquot of this material was then ball milled in a 1.02 liter stainless steel jar according to the procedure described in Example 4, treated with triethyl aluminum and used as a catalyst for the polymerization of propylene.

The polymerization procedure was similar to that described in Example 4, although the catalyst (0.504 gram VCl$_3$·0.33AlCl$_3$ and 0.475 gram triethyl aluminum) was added to the propylene-saturated diluent at 40° C. and the temperature raised to 60° C. in 20 minutes. The polymerization was then continued at this temperature for 100 minutes or for a total of 2 hours.

The yield consisted of 54.2 grams of solid and 1.8 gram waxy polymer. The solid polymer had a viscosity average molecular weight of 775,000 and was less crystalline and more flexible than the polymers obtained with titanium based catalysts (density=0.8814 gram./cc.).

EXAMPLE 13

Polymerization of C$_4$-C$_{18}$ alpha-olefins with ball milled gamma-TiCl$_3$·0.33AlCl$_3$ The general usefulness of the gamma-TiCl$_3$·0.33AlCl$_3$ component prepared according to Example 2, Run 5, for polymerizing alpha-olefins was demonstrated in a series of experiments in which 10 different linear alpha-olefins having from 4 to 18 carbon atoms were polymerized in the 2 liter stirred glass reactor previously described in Example 3. The method of preparing the catalyst and the polymerization procedure were essentially the same as described in Example 4 for the polymerization of propylene with a ball milled TiCl$_3$·0.33AlCl$_3$ component although 1-pentene and the higher alpha-olefins, which are liquid at room temperature, had to be added in liquid form from an addition funnel. The rate of addition of these monomers and the results of all the polymerizations are given in Table XII.

As can be seen from the table, the ball milled gamma-TiCl$_3$·0.33AlCl$_3$ catalyst component in combination with AlEt$_3$ was able to polymerize all the monomers to high molecular weight polymers at good rates and under very mild conditions. Since the Kinsinger equation for converting inherent viscosity to molecular weight is valid only for polypropylene, the number average molecular weight as determined by membrane osmometry is also reported in the table.

TABLE XII.—POLYMERIZATION OF HIGHER ALPHA-OLEFINS WITH A BALL MILLED GAMMA-TiCl$_3$·0.33AlCl$_3$ CATALYST COMPONENT PREPARED ACCORDING TO EXAMPLE 2, RUN 5

[2 l. Glass Batch Unit, Atmospheric Pressure, 1 l. Xylene Diluent]

|  | Run No. | | | | | | |
|---|---|---|---|---|---|---|---|
|  | 1 | 2 | 3 | 4 | 5 | 6 | 7 |
| Monomer [a]: |  |  |  |  |  |  |  |
|   Type | 1-butene | 1-butene [b] | 1-pentene | 1-pentene | 1-hexene | 1-hexene | 1-hexene [o] |
|   Weight, grams | [f] | [f] | 175 [g] | 175 [h] | 212 [g] | 212 [i] | 257 [j] |
| Catalyst: |  |  |  |  |  |  |  |
|   TiCl$_3$·0.33AlCl$_3$, grams | 0.500 | 0.500 | 0.500 | 0.500 | 0.500 | 0.500 | 0.500 |
|   AlEt$_3$, grams | 0.475 | 0.475 | 0.475 | 0.475 | 0.475 | 0.475 | 0.475 |
|   Al/Ti mole ratio [n] | 2 | 2 | 2 | 2 | 2 | 2 | 2 |
| Reaction conditions: |  |  |  |  |  |  |  |
|   Temperature, °C | 75 [p] | 75 [p] | 75 | 75 | 75 | 75 | 75 |
|   Time, hours | 1 | 1 | 1 | 1 | 1 | 2 | 3 |
| Results: |  |  |  |  |  |  |  |
|   Polymer yield, grams | 114.5 | 122.1 | 63.0 | 103.2 | 41.6 | 101.8 | 170.9 |
|   Low mol. wt. polymer, percent | 3.1 | 3.6 | 10.1 | 3.6 | 11.1 | 6.9 | 5.9 |
|   Catalyst efficiency, g./g | 117.4 | 125.6 | 64.6 | 106.0 | 42.7 | 104.3 | 175.3 |
| Properties of high mol. wt. polymer: |  |  |  |  |  |  |  |
|   Viscosity av. mol. wt.×10$^{-3}$ [r] | 334 | 153 | 385 | 411 | 143 | 333 | 127 |
|   Number av. mol. wt.×10$^{-3}$ [s] | 114 | 66 | 175 | 162 | 105 | 185 | 89 |
|   Melting point, °C | 120 | 120 | 73 | 80 |  |  |  |
|   Density, g./cc | 0.875 | 0.878 |  |  |  |  |  |

See footnotes at end of tables.

TABLE XII—Continued

| | Run No. | | | | | | |
|---|---|---|---|---|---|---|---|
| | 8 | 9 | 10 | 11 | 12 | 13 | 14 |
| Monomer [a]: | | | | | | | |
| Type | 1-hexene [c] | 1-hexene | 1-hexene | 1-heptane | 1-octene | 1-decene | 1-dodecene. |
| Weight, grams | 257 [j] | 163.5 [k] | 163.5 [k] | 170 [k] | 206 [g] | 206 [g] | 212 [g]. |
| Catalyst: | | | | | | | |
| $TiCl_3 \cdot 0.33AlCl_3$, grams | 0.500 | 1.0 | 1.0 | 1.0 | 0.500 | 0.500 | 0.500. |
| $AlEt_3$, grams | 0.654 [m] | 0.95 | 0.666 | 0.666 | 0.475 | 0.475 | 0.475. |
| Al/Ti mole ratio [n] | 2 [o] | 2 | 1.17 | 1.17 | 2 | 2 | 2. |
| Reaction conditions: | | | | | | | |
| Temperature, °C | 75 | 40 | 40 | 40 | 75 | 75 | 75. |
| Time, hours | 3 | 3 | 3 | 3 | 2 | 2 | 1.83. |
| Results: | | | | | | | |
| Polymer yield, grams | 46.1 | 110.5 | 97.1 | 46.4 | 150.2 | 131.7 | 150.6. |
| Low mol. wt. polymer, percent | 26.1 | 7.2 | 6.0 | 7.3 | 2.3 | 3.0 | 1.6. |
| Catalyst efficiency, g./g. | 39.9 | 56.7 | 58.3 | 27.9 | 154.0 | 135.0 | 157.1. |
| Properties of high mol. wt. polymer: | | | | | | | |
| Viscosity av. mol. wt. ×$10^{-3}$ [r] | 189 | 147 | 306 | 298 | 295 | 309 | 240. |
| Number av. mol. wt. ×$10^{-3}$ [s] | | | 155 | 265 | 164 | 250 | 270. |
| Melting point, °C | | | | | | 29 | 44. |
| Density, g./cc | | | | | | | |

| | 15 | 16 | 17 | 18 | 19 | 20 | 21 |
|---|---|---|---|---|---|---|---|
| Monomer [a]: | | | | | | | |
| Type | 1-tetradecene | 1-tetradecene [d] | 1-hexadecene | 1-hexadecene | 1-hexadecene [o] | 1-octadecene | 1-octadecene. |
| Weight, grams | 215 [g] | 215 [g] | 218 [g] | 218 [g] | 246 [i] | 177 [l] | 220 [g]. |
| Catalyst: | | | | | | | |
| $TiCl_3 \cdot 0.33AlCl_3$, grams | 0.500 | 0.500 | 1.00 | 1.00 | 0.500 | 1.00 | 0.500. |
| $AlEt_3$, grams | 0.475 | 0.475 | 0.95 | 0.95 | 0.475 | 0.95 | 0.475. |
| Al/Ti mole ratio [n] | 2 | 2 | 2 | 2 | 2 | 2 | 2. |
| Reactions conditions: | | | | | | | |
| Temperature, °C | 75 | 75 | 50 | 75 | 75 | 75 | 75. |
| Time, hours | 2.5 | 2.5 | 2 | 2 | 2 | 3 | 2. |
| Results: | | | | | | | |
| Polymer yield, grams | 102.7 | 141.8 | 82.4 | 61.4 | 81.2 | 36.1 | >105.2 [q]. |
| Low mol. wt. polymer, percent | 7.0 | 4.7 | 3.9 | 1.3 | 11.8 | 7.8 | ([q]). |
| Catalyst efficiency, g./g. | 105.3 | 145.3 | 42.3 | 31.4 | 83.3 | 18.5 | >108.0. |
| Properties of high mol. wt. polymer: | | | | | | | |
| Viscosity av. mol. wt. ×$10^{-3}$ [r] | 199 | 97.8 | 150 | 110 | 95.5 | 195 | 240. |
| Number av. mol. wt. ×$10^{-3}$ [s] | 145 | 93 | 165 | 155 | 99 | | 270. |
| Melting point, °C | 52 | 55 | 63 | 61 | 38 | 69 | 71. |
| Density, g./cc | | | | | | | |

[a] The monomer used in Runs 1 and 2 was dried in towers containing Ascerite and Drierite and in two scrubbers containing 25% triethylaluminum in a paraffin oil. The monomer used in Runs 3–6, 9–11, 14 and 17–20 was dried by adding about 4 ml. triethylaluminum to one liter monomer and then distilling off the monomer, if necessary at reduced pressure. A 90% heart cut was used in the polymerization. The monomer used in Runs 7, 8, 12, 13, 15, 16 and 21 was dried by being stored over clean sodium wire for 5 days. A 90% heart cut was used for the polymerization.
[b] 0.5% hydrogen was added with the 1-butene.
[c] Dry hydrogen was added at a rate of 30 ml./min. throughout the polymerization.
[d] Dry hydrogen was added at a rate of 20 ml./min. throughout the polymerization.
[e] Dry hydrogen was added at a rate of 10 ml./min. throughout the polymerization.
[f] Dry, purified 1-butene gas added at a rate of about 2 l./min. throughout the polymerization to keep the diluent saturated with monomer.
[g] 35.7% of the monomer added at the beginning and the rest at constant rate during the following 60 minutes.
[h] 35.7% of the monomer added at the beginning and the rest at constant rate during the following 30 minutes.
[i] 35.7% of the monomer added at the beginning and the rest at constant rate between 30 and 90 minutes in the polymerization.
[j] 29.5% of the monomer added at the beginning and the rest at constant rate throughout the polymerization.
[k] 41.0% of the monomer added at the beginning and the rest at constant rate during the following 2 hrs.
[l] 44.4% of the monomer added at the beginning and the rest at constant rate during the following 40 minutes.
[m] Triethylgallium was used instead of triethylaluminum.
[n] Includes $AlCl_3$ in the solid catalyst component.
[o] (Al+Ga)/Ti ratio.
[p] The catalyst was added at 60° C. and the temperature increased to 75° C. in 10 minutes.
[q] The low mol. wt. polymer fraction was not recovered and is not included in the weight.
[r] Calculated from the inherent viscosity as measured in decaline at 130° C. by using the Kinsinger equation for polypropylene (Thesis, University of Pennsylvania, 1957).
[s] Determined by membrane osmometry.

EXAMPLE 14

Preparation of gamma-$TiCl_3 \cdot 0.36AlCl_3$

To demonstrate that it is not necessary to remove all or any of the $AlCl_3$ grinding aid from a milled $n$Al-1$AlCl_3$ mixture if one wants to make a gamma-$TiCl_3 \cdot yAlCl_3$ preparation was illustrated in an experiment in which $TiCl_4$ was reduced with the 12Al-1$AlCl_3$ mixture obtained directly after the milling step of Example 1. The procedure and the conditions used for the reduction were essentially the same as those used in Example 2, Run 5, except that 9 grams of the 12Al-1$AlCl_3$ mixture were employed instead of 9 grams of the purified activated aluminum powder.

After the reaction mixture had been allowed to reflux for 30 minutes at 161° C., 137.8 grams were obtained of a bright lilac, finely divided powder having the composition $TiCl_3 \cdot 0.36AlCl_3$ and exhibiting the typical gamma-$TiCl_3 \cdot yAlCl_3$ X-ray diffraction pattern corresponding to the interplanar d-spacings listed previously.

Since 9 grams of a 12Al-1$AlCl_3$ mixture corresponds to only 0.236 atom of aluminum, the theoretical yield in this experiment corresponded to only 143.3 grams of $TiCl_3 \cdot 0.36AlCl_3$. The practical yield obtained after washing and drying of the preparation was no less than 96% of the theoretical.

EXAMPLE 15

Polymerization of propylene with gamma-$TiCl_3 \cdot 0.36AlCl_3$

The high catalytic activity of the gamma-$TiCl_3 \cdot 0.36AlCl_3$ prepared according to Example 14 was demonstrated in experiments in which it was used together with $AlEt_3$ as a catalyst for polymerization of propylene. In one case 2.03 grams of the original gamma-$TiCl_3 \cdot 0.36AlCl_3$ preparation and 1.87 grams $AlEt_3$ were employed in a propylene polymerization carried out according to the procedure of Example 3.

The yield amounted to 112.7 grams of solid polymer and 4.4 grams of waxy polymer. The viscosity average molecular weight of the solid polymer was 515,000. The polymer's physical properties are illustrated by its density of 0.9020 grams/cc. and its tensile strength of 4000 p.s.i.

In a second experiment, 123 grams of the gamma-$TiCl_3 \cdot 0.36AlCl_3$ preparation were first ball milled in a 1.02 liter stainless steel jar for 6 days as described in Example 4. A 0.507 gram aliquot of the ball milled preparation was then used together with 0.492 gram of $AlEt_3$ for polymerizing propylene according to the method described in Example 4. The yield, 134.5 grams of solid and 3.1 grams of waxy polymer indicated, that this ball milled gamma-$TiCl_3 \cdot 0.36AlCl_3$ preparation was even more active than the ball milled gamma-TiCl₃·0.33AlCl₃ preparation used in Example 4. However, this may at least in part be the result of the more efficient milling resulting from a somewhat smaller ball mill charge for the TiCl₃·0.36AlCl₃ preparation. The viscosity average molecular weight, density and tensile strength of the solid polymer were 450,000; 0.8974 grams/cc.; and 3810 p.s.i., respectively.

EXAMPLE 16

Reduction of TiCl with highly activated 6Al-1AlCl₃ mixture in n-decane

Since it has been disclosed in the literature that AlCl₃ promotes the reaction between aluminum and TiCl₄ (Ruff, O., and Neumann, F., Z. anorg. allgem. Chem., 128, 81 (1923)) it was decided to investigate if this alleged catalysis would make it possible to prepare gramma-TiCl₃·xAlCl₃ by reduction of TiCl₄ with a highly activated nAl-1AlCl₃ mixture in an aliphatic diluent and at moderate temperatures.

For this purpose a strongly activated 6Al-1AlCl₃ mixture was first prepared by ball milling 324 grams (12 atoms) of aluminum powder (Alcoa Grade #123) and 266.68 grams (2 moles) of AlCl₃ in a ½ gallon stainless steel jar for 14 days with ⅝″ diameter chrome alloy steel balls as the grinding medium. Aliquots of the rather dark colored highly activated powder recovered after the milling operation were then used in a series of reduction experiments.

In Runs 1 to 4 where pure n-decane was used as the diluent a pinkish tinge developed on the activated aluminum powder after about 25–35 minutes when the temperature had reached the range of 70–90° C. The color gradually intensified as the temperature was raised so that the slurry became violet with no metallic particles visible after 60–70 minutes when the temperature reached 120–130° C. Very little reduction had occurred at this time.

In the first two runs, in which the reaction mixture was heated to the reflux temperature, 156° C., fairly little reaction had taken place one hour after the refluxing had started, although considerable diluent decomposition was already evident from the increased viscosity and dark color of the diluent. In Run 1, in which 1 liter of diluent was employed, the tar formation from diluent decomposition became so severe that the reaction mixture formed a tacky blackish violet mass which adhered to the reaction flask, even though this amount of diluent had been found entirely satisfactory for the same reactant charge in all experiments according to the method of this invention.

For this reason, a larger diluent volume, 1.5 liters, was employed in Run 2, but even this larger volume became so severely decomposed, that the resulting tar formation caused the stirrer to stick after 13 hours of refluxing.

Since it was apparent that satisfactory results could not be obtained at 156° C., it was decided to carry out the next two experiments at 120° C. However, as can be seen from the yields obtained in Runs 3 and 4 only about 25% reaction had taken place after 18 hours at this temperature. At that time the diluent decomposition was already severe as evidenced by the very dark color of the filtrate obtained during the recovery procedure. It is very doubtful, therefore, that a pure TiCl₃·0.33AlCl₃ preparation, independent of crystallographic structure, could have been obtained by this method.

By contrast refluxing for only 0.5 hour at 86° C. in a 1/1 (vol./vol.) mixture of n-heptane and benzene resulted in complete reaction and in a recovered yield corresponding to 96.4% of the theoretical without any observable diluent decomposition taking place. In this experiment the product was beta-TiCl₃·0.39AlCl₃ as a result primarily of the low reaction temperature but also of the presence of 50 vol. percent of an aromatic diluent which is in the upper limit for formation of crystallographically pure gamma-TiCl₃·xAlCl₃.

TABLE XIII.—REDUCTION OF TiCl₄ WITH ACTIVATED 6Al-1AlCl₃ MIXTURES IN HYDROCARBON DILUENTS

[2 Moles TiCl₄, ⅔ Atom Al as Activated 6Al-1AlCl₃ Mixture ᵃ]

| | Run | | | | |
|---|---|---|---|---|---|
| | 1 | 2 | 3 | 4 | 5 |
| Diluent | n-decane | n-decane | n-decane | n-decane | n-heptane-benzene(1./1.). |
| Reaction conditions: | | | | | |
| Diluent volume, l | 1 | 1.5 | 2 | 2 | 2. |
| Reflux temperature ° C | 156 | 156ᵇ | 120 ᶜ | 120 ᶜ | 86. |
| Time at reflux temp., hrs | 13.5 | 13 | 5 | 18 | 0.5. |
| Yield, g.ᵈ | (ᵉ) | (ᶠ) | 68.0 | 127 | 396.8. |
| Color of product | Blackish violet | Blackish violet | Violet | Violet | Brown. |

ᵃ Steel ball milled for 14 days.
ᵇ The reflux temperature dropped to 148° C. after about 2 hrs. due to diluent decomposition.ᶠ
ᶜ Temperature kept constant below refluxing with the help of a constant temperature device.
ᵈ After washing and drying. The theoretical yield was 412.3 g.
ᵉ The product stuck to the reaction flask. Recovery was difficult, if not impossible, due to the presence of fairly insoluble tarry material which made the product a tacky mass.
ᶠ Tar formation caused the stirrer to stick during refluxing overnight.

It is to be understood that this invention is not limited to the specific examples which have been offered merely as illustrations and that modifications may be made without departing from the spirit of the invention.

What is claimed is:

1. A process for the preparation of essentially pure catalyst components comprising contacting $MX_4$ wherein M is selected from the group consisting of titanium and vanadium and X is selected from the group consisting of chlorine and bromine in a hydrocarbon diluent system containing at least about 5.0 volume percent of an aromatic hydrocarbon at a temperature between 100° and 250° C. with highly activated aluminum powder produced by severely attriting the aluminum powder in an inert atmosphere with a solid, non-alkali, metal halide in the absence of a diluent, said metal halide having a metal moiety at least as electropositive as aluminum, to form a product having the general formula $MX_x·yAlX_3$, wherein M is selected from the group consisting of titanium and vanadium, X is selected from the group consisting of chlorine and bromine, $x$ varied from 2.5 to 3.0, and $y$ varies from 0.33 to 0.67, and thereafter recovering said product substantially free of impurities.

2. The process of claim 1 wherein said aluminum powder is activated to an extent sufficient to reduce a one molar solution of titanium tetrachloride in benzene to brown titanium trichloride at room temperature immediately upon mixing said powder with said solution.

3. The process of claim 7 wherein said metal halide is aluminum chloride.

4. A process for the preparation of essentially pure crystalline gamma titanium chloride containing cocrystallized aluminum chloride comprising contacting titanium tetrachloride in a hydrocarbon diluent mixture comprising a major amount of aliphatic hydrocarbons and a minor amount of at least 5.0 volume percent of aromatic hydrocarbons at a temperature between 125° and 195° C. with highly activated aluminum powder produced by severely attriting the aluminum powder in an inert atmosphere with a solid, non-alkali, metal halide in the absence of a diluent, said metal halide having a metal moiety at least as electropositive as aluminum, to form a reaction product, and thereafter recovering said gamma titanium chloride product substantially free of other crystalline modifications of titanium chloride.

5. The process of claim 4 wherein said diluent mixture comprises at least about 50 volume percent of an aliphatic hydrocarbon having 6 to 20 carbon atoms and from about 5 to 20 volume percent of an aromatic hydrocarbon having from 6 to 18 carbon atoms.

6. The process of claim 4 wherein said aluminum powder is activated to an extent sufficient to reduce a one molar solution of titanium tetrachloride in benzene to brown titanium trichloride at room temperature immediately upon mixing said powder with said solution.

7. The process of claim 6 wherein said metal halide is aluminum chloride.

8. The process of claim 6 wherein said metal halide is $TiCl_3 \cdot 0.33AlCl_3$.

9. The process of claim 6 wherein from 0.3 to 0.4 atom of aluminum powder is used per mole of titanium tetrachloride.

10. The process of claim 6 wherein the product formed has the general formula $TiCl_3 \cdot 0.33AlCl_3$.

11. The process of claim 7 wherein the mole ratio of aluminum powder to aluminum chloride is in the range of from about 3:1 to 12:1.

References Cited

UNITED STATES PATENTS

| | | | |
|---|---|---|---|
| 3,420,809 | 1/1969 | Tornquist | 252—442 |
| 3,424,774 | 1/1969 | Tornquist | 252—429 |
| 3,301,494 | 1/1967 | Tornquist | 241—22 |
| 2,927,105 | 3/1960 | Nienburg et al. | 23—87 |
| 3,032,513 | 5/1962 | Tornquist et al. | 252—442 |
| 3,093,625 | 6/1963 | Friederich et al. | 252—429 |
| 3,109,822 | 11/1963 | Kaufman et al. | 252—429 |
| 3,126,424 | 3/1964 | Mueller et al. | 252—442 |
| 3,322,803 | 5/1967 | Vohwinkel et al. | 260—94.9 |

FOREIGN PATENTS

| | | |
|---|---|---|
| 895,418 | 5/1962 | Great Britain. |

DANIEL E. WYMAN, Primary Examiner

P. E. KONOPKA, Assistant Examiner

U.S. Cl. X.R.

23—87; 252—429, 441; 260—93.7, 94.9